M. M. GOLDBERG.
VARIABLE SPEED ALTERNATING CURRENT MOTOR.
APPLICATION FILED MAR. 4, 1912.
1,052,478.
Patented Feb. 11, 1913.
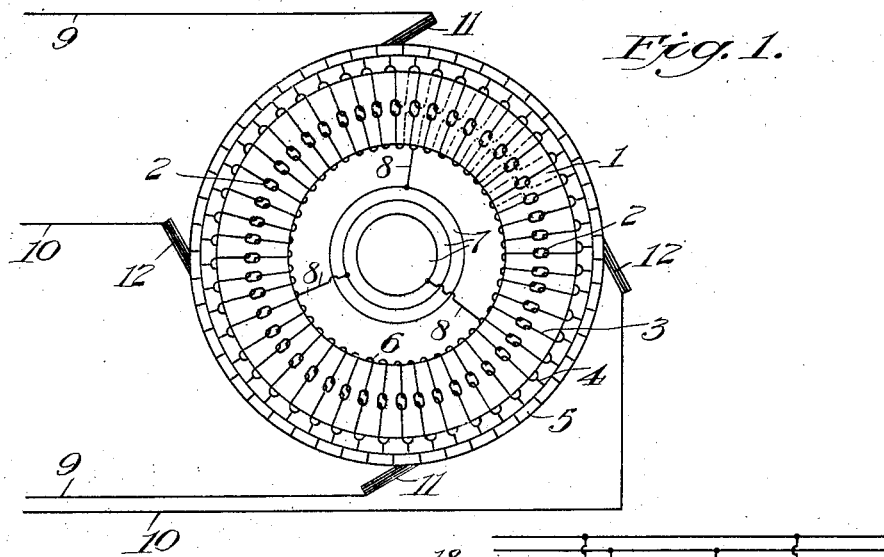
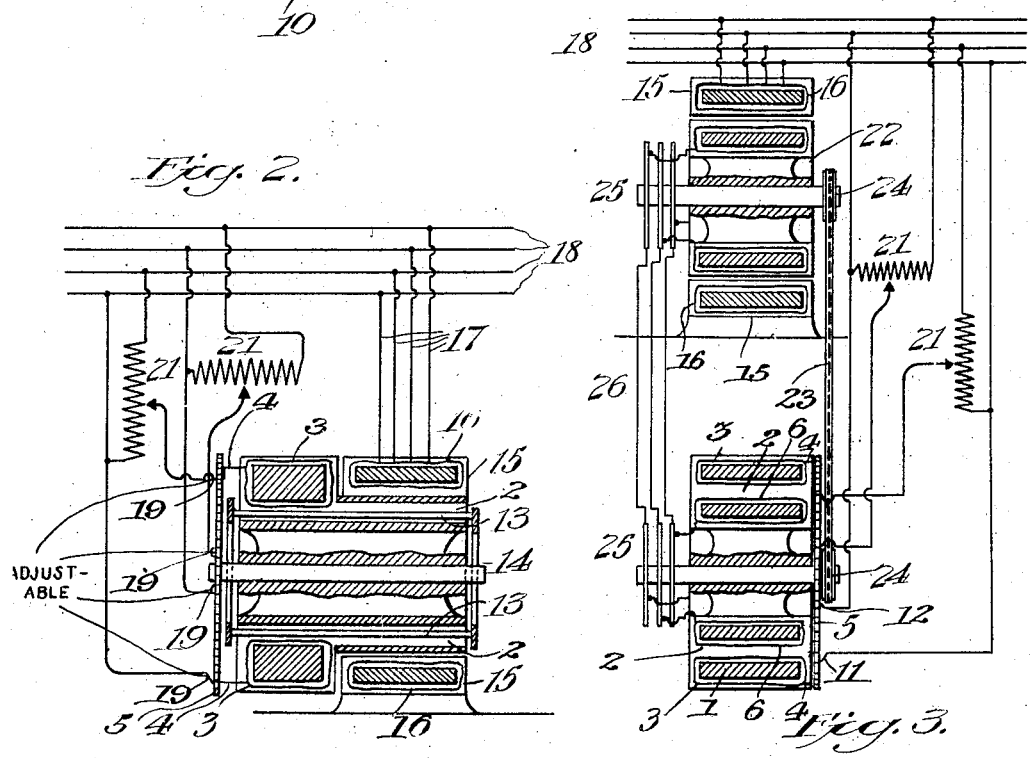
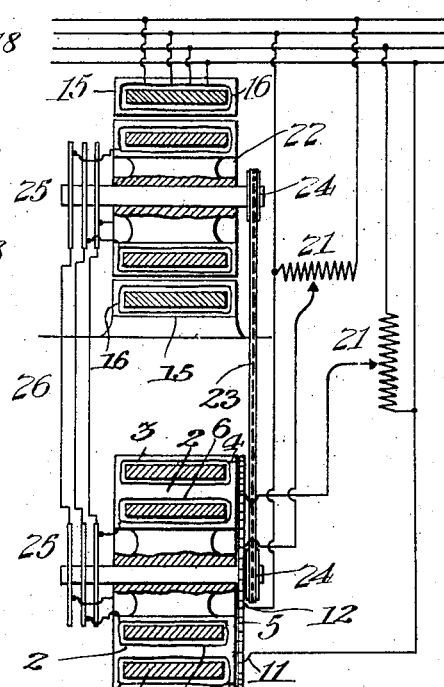
Witnesses
Inventor
Maximilian M. Goldberg
by
his Attorney

UNITED STATES PATENT OFFICE.

MAXIMILIAN M. GOLDBERG, OF ITHACA, NEW YORK.

VARIABLE-SPEED ALTERNATING-CURRENT MOTOR.

1,052,478.

Specification of Letters Patent.   Patented Feb. 11, 1913.

Application filed March 4, 1912. Serial No. 681,440.

*To all whom it may concern:*

Be it known that I, MAXIMILIAN M. GOLDBERG, a citizen of the United States, residing at Ithaca, in the county of Tompkins and State of New York, have invented a certain new and useful Improvement in Variable-Speed Alternating-Current Motors, of which the following is a full, clear, and exact description.

The object of this invention is to provide an induction motor, of simple construction and effective in operation, comprising a frequency transformer in which there is no torque action, combined with an induction motor in such a manner as to produce a motor of varying speeds.

The invention consists in the combination with an induction motor, of a frequency transformer, comprising a single iron core, a closed-coil or continuous primary winding having its coils connected with a multi-segmental commutator, and a secondary winding having its terminals connected with slip rings or any other suitable contacts or connections, the secondary winding of said transformer being connected in series or parallel with the secondary windings of the induction motor, all substantially as I will proceed now more particularly to set forth and finally claim.

In the accompanying drawings, illustrating the invention, in the several figures of which like parts are similarly designated, Figure 1 represents somewhat diagrammatically the frequency transformer with phase-wound secondary, showing brushes to engage the multi-segmental commutator for supplying two-phase currents to the transformer. Fig. 2 represents diagrammatically the frequency transformer combined with an induction motor, the secondary windings of the transformer and induction motor being of the squirrel-cage type and mounted upon or carried by the same or one core, and Fig. 3 represents diagrammatically the frequency transformer of Fig. 1, combined with an induction motor and showing the transformer and motor separated from one another with the transformer and the rotor of the motor geared together.

As shown in Fig. 1, the frequency transformer comprises a core 1, which may be of any usual or approved construction, but preferably of the laminated type, and provided with an annular series of holes or perforations 2. Wound upon the same core 1 and having its coils passing successively through the holes or perforations 2, is the continuous or closed-coil primary winding 3, having its successive coils connected, by branches 4, with suitably insulated segments of a multi-segmental commutator 5. Wound upon the same core 1 is the secondary winding 6 having its successive coils passing through the holes or perforations 2 of the core 1, and having its terminals connected by branches 8 with slip ring contacts 7, the said secondary winding being similar to the secondary winding of an ordinary induction motor. The primary winding 3 of the transformer as thus constructed, is adapted to receive polyphase currents from feed wires 9, 9 and 10, 10, respectively, through brushes 11, 11 and 12, 12, respectively, engaging the multi-segmental commutator 5, at substantially diametrically opposite points, the number of which currents or circuits depending upon the number of phases it is desired to employ.

The core 1 with its primary and secondary windings 3 and 6, and the brushes 11 and 12, are adapted to be rotated relatively to each other, and it is immaterial whether the core rotates and the brushes remain stationary, or the core remains stationary and the brushes rotate. The position of the axis of the alternating field, which is set up by each primary phase is determined by the position of the brushes through which each phase is supplied with current. If the brushes are stationary, the magnetic axes of the fields are also stationary, and the action of the fields is as if the primary coils were stationary and the secondary coils were in rotation. If the brushes rotate, the magnetic axes of the fields also rotate with the speed of the brushes, and the action of those fields is as if the primary coils were in rotation and the secondary coils were stationary. In either case, the currents induced in the secondary windings 6 have a frequency depending upon the relative motion, that is to say, the frequency in the secondary winding is proportional to the slip. In this respect the conditions in the frequency transformer are similar to the conditions in an ordinary induction motor. That is to say, when the machine is at a standstill, and the slip is 100 per cent., the frequency in the secondary winding is equal to the frequency in the primary winding. When running at synchronous speed, the frequency in the secondary winding is zero and the secondary induced electromotive force will be zero. This, it will be observed, differs from the ordinary induction motor in so far as there is no relative motion between the conductors of the primary winding and the conductors of the secondary winding, and consequently there is no torque action in the frequency transformer.

As shown in Fig. 1, the frequency transformer is shown in connection with stationary brushes, and is of a bi-polar construction supplied with two-phase currents, and the secondary winding is shown as comprising three phases connected to three slip-ring contacts. As will be observed from this arrangement, the number of phases in the secondary does not need to be equal to the number of phases in the primary.

In Fig. 2, the secondary winding of the frequency transformer and induction motor is shown as of the squirrel-cage type instead of being phase-wound as in the transformer shown in Fig. 1.

As above stated, the frequency transformer is particularly designed for use in combination with an induction motor. In the ordinary induction motor the current in the secondary is not in phase with the electro-motive force, and on account of the inductive reactance, the current lags behind the electro-motive force and the angle of lag is larger the lower the speed of the motor. The result of this is that the torque exerted by the induction motor is small, when the speed is low.

Fig. 2 represents an induction motor combined with the frequency transformer as above constructed, and the secondaries 13 of the induction motor and the frequency transformer are wound or mounted upon one and the same core 14. The squirrel-cage secondary of the induction motor is merely a continuation of the squirrel-cage secondary of the frequency transformer. Their secondaries are thus interconnected in series with each other in the most simple way. The stator 15 of the induction motor has the usual primary winding 16 which is connected to a polyphase supply 17, and as herein shown, a two-phase supply connected with the feed wires 18. The brushes 19 of the frequency transformer 20 are connected to the secondary terminals of a polyphase potential regulator 21. The primary terminals of the potential regulator are connected to the supply or feed wires 18.

In accordance with this invention by combining an induction motor with a frequency transformer of the construction herein, the current in the secondary can be brought in phase with or in advance of the electro-motive force and a large torque can be exerted at high speeds as well as at low speeds, and also at a standstill. If the induction motor is combined with the frequency transformer as herein described, their secondaries are rigidly connected with each other and have the same number of phases which are interconnected with each other. The respective speeds of the two machines are in inverse ratio to their numbers of poles. If the machines have a common axis, as in Fig. 2, they have the same number of poles. Two electro-motive forces are then induced in the so combined secondary, and one of such forces due to the induction motor is induced in one part of the secondary and the other of such forces due to the frequency transformer is induced in the other half of the secondary. Thus it will be observed that the magnitude and phase of the current flowing in the secondary will depend upon the magnitudes and the phase-displacement of the two electro-motive forces. The phase-displacement of the two electro-motive forces is varied by shifting the brushes relatively to the magnetic axes of the primary of the induction motor as thus combined with the frequency transformer of the present invention. The magnitude of the electro-motive force induced by the frequency transformer may be varied by connecting the brushes to the secondary of the polyphase potential regulator. The shifting of the brushes 11 and 12, respectively, and the variations in the potential regulator 21 may be done by hand or automatically with variation of speed in any well known manner.

By this construction, it will be evident that at low speeds the current is usually brought in phase with the electro-motive force which is induced by the induction motor, and at high speeds it is more advantageous to have the current in advance of the electro-motive force, as then the magnetizing current of the induction motor will be compensated for and the power factor of the motor raised to equal one. Furthermore, by this construction and as above stated, the frequency transformer is especially designed to be used in combination with an induction motor so as to make the latter a variable speed motor.

In Fig. 3 I have shown another arrangement of induction motor combined with the frequency transformer, in which the frequency transformer and the motor are separated from one another and in which the core 1 of the frequency transformer is geared to the rotor 22 of the induction motor by means of chain and sprocket gearing 23 and 24, respectively, to cause said core and rotor to rotate at corresponding speeds, that is, the speed of both machines being the same if their number of poles is the same, or their speeds being in inverse ratio to their numbers of poles if they have different number of poles; and the secondaries of the frequency transformer and the rotor of the induction motor being connected in series or parallel by means of the slip-ring contacts 25 and connecting wires 26. The feed or supply connections in this arrangement are similar to those shown in Fig. 2.

It is obvious that the frequency transformer and the induction motor may be separated one from the other and mounted upon the same shaft with the secondaries of the transformer and the induction motor connected in series in any suitable manner, to produce the same result as the arrangement shown in Fig. 3.

What I claim is:—

1. In a variable speed motor, the combination of a frequency transformer, comprising a single core, a closed, continuous primary winding upon said core, a multi-segmental commutator having its segments connected with the successive coils of said primary winding, brushes and means for supplying and regulating polyphase currents to said primary winding through said commutator, said core having a portion extending beyond said primary winding and constituting the rotor of an induction motor, and a secondary winding upon said core extending throughout its length, a winding in inductive relation to said secondary winding and constituting the primary of the induction motor, and means for supplying polyphase currents to the primary winding of the induction motor.

2. In a variable speed motor, the combination of a frequency transformer, comprising a single core, a closed, continuous primary winding upon the outer periphery of said core, a multi-segmental commutator having its segments connected with the successive coils of said primary winding, brushes and means for supplying and regulating polyphase currents to said primary winding through said commutator, said core having a portion extending beyond said primary winding and constituting the rotor of an induction motor, and a secondary winding upon said core extending throughout its length, a stator surrounding the extended portion of said core and constituting the primary of said induction motor, and means for supplying polyphase currents to said stator.

3. In a variable speed motor, the combination of a frequency transformer, comprising a single core, a closed, continuous primary winding upon said core, a multi-segmental commutator having its segments connected with the successive coils of said primary winding, brushes and means for supplying polyphase currents to said primary winding through said commutator, said core having a portion extending beyond said primary winding and constituting the rotor of an induction motor, and a secondary winding upon said core extending throughout its length, a primary winding surrounding said rotor and constituting the stator of said induction motor, and means for supplying polyphase currents to the primary winding of the induction motor, said brushes being adjustable with relation to the magnetic axes of the primary winding of the induction motor to vary the phase-displacement of the two electro-motive forces induced in the secondary.

4. In a variable speed motor, the combination of a frequency transformer, comprising a core, a closed, continuous primary winding upon said core, a multi-segmental commutator having its segments connected with the successive coils of said primary winding, adjustable brushes and means for supplying and regulating polyphase currents to said primary winding through said commutator, and a secondary winding upon said core, a wound induction motor rotor connected with the core of the frequency transformer to rotate at a corresponding speed therewith, the secondary winding of the frequency transformer and said induction motor rotor connected in series, a wound stator coöperating with said rotor, and means for supplying polyphase currents to the winding of said stator.

In testimony whereof I have hereunto set my hand this 28 day of February A. D. 1912.

MAXIMILIAN M. GOLDBERG.

Witnesses:
LEW D. FALLIS,
H. O. TAYLOR.